(«12») United States Patent
Lee et al.

(10) Patent No.: US 10,461,882 B2
(45) Date of Patent: Oct. 29, 2019

(54) OPTICAL NETWORK UNIT FOR OPTICAL TRANSMISSION IN BURST MODE

(71) Applicant: ELECTRONICS AND TELECOMMUNICATIONS RESEARCH INSTITUTE, Daejeon (KR)

(72) Inventors: Han Hyub Lee, Daejeon (KR); Hwan Seok Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/203,665

(22) Filed: Nov. 29, 2018

(65) Prior Publication Data

US 2019/0305871 A1   Oct. 3, 2019

(30) Foreign Application Priority Data

Apr. 2, 2018   (KR) .................. 10-2018-0038149

(51) Int. Cl.
*H04J 14/02*   (2006.01)
*H04J 3/16*    (2006.01)

(52) U.S. Cl.
CPC ........ *H04J 14/0278* (2013.01); *H04J 3/1694* (2013.01); *H04J 14/0227* (2013.01)

(58) Field of Classification Search
CPC ... H04J 14/0278; H04J 14/0227; H04J 3/1694
USPC ........................................... 398/79
See application file for complete search history.

(56) References Cited

U.S. PATENT DOCUMENTS

| 4,819,241 | A | 4/1989 | Nagano | |
|---|---|---|---|---|
| 9,325,421 | B1 * | 4/2016 | Jiang | H04B 10/503 |
| 2008/0044185 | A1 | 2/2008 | Lee et al. | |
| 2008/0138073 | A1 | 6/2008 | Kim et al. | |
| 2010/0135665 | A1 | 6/2010 | Lee et al. | |
| 2010/0295538 | A1 * | 11/2010 | Okada | G01R 19/0092 324/96 |

(Continued)

FOREIGN PATENT DOCUMENTS

KR    10-2015-0040742 A    4/2015

OTHER PUBLICATIONS

Tetsuro Ashida et al., "Experimental Study of C-band EML based ONU Burst-mode Transmitter for 40 Gbit/s TWDM-PON", OFC 2015, Optical Society of America.

*Primary Examiner* — Dalzid E Singh
(74) *Attorney, Agent, or Firm* — LRK Patent Law Firm (57) ABSTRACT

An optical network unit (ONU) for optical transmission in a burst mode includes an electro-absorption modulated laser (EML) transmitter including a laser diode (LD) and configured to transmit an uplink optical signal through the LD, an electro-absorption modulator (EAM) driver integrated circuit (IC) (EAM driver IC) configured to amplify an uplink data signal and provide the amplified data signal to the EML transmitter, an LD burst-mode driving circuit configured to control an operation of turning on or off the LD based on a burst-enable signal, and a media access control (MAC) configured to transmit the data signal to the EAM driver IC and transmit the burst-enable signal to the LD burst-mode driving circuit.

20 Claims, 6 Drawing Sheets

(56) References Cited

U.S. PATENT DOCUMENTS

| | | | |
|---|---|---|---|
| 2011/0150475 A1* | 6/2011 | Soto | H04B 10/2503 |
| | | | 398/63 |
| 2012/0301151 A1* | 11/2012 | Hu | H04B 10/40 |
| | | | 398/135 |
| 2014/0119396 A1* | 5/2014 | Dvir | H04B 10/00 |
| | | | 372/38.02 |
| 2015/0104179 A1* | 4/2015 | Wang | H04B 10/564 |
| | | | 398/81 |
| 2017/0237232 A1* | 8/2017 | Asaka | H01S 5/042 |
| | | | 372/38.02 |
| 2017/0256907 A1* | 9/2017 | Wang | H01S 5/0261 |

* cited by examiner

OPTICAL NETWORK UNIT FOR OPTICAL TRANSMISSION IN BURST MODE

CROSS-REFERENCE TO RELATED APPLICATION(S)

This application claims the priority benefit under 35 USC § 119(a) of Korean Patent Application No. 10-2018-0038149, filed Apr. 2, 2018, in the Korean Intellectual Property Office, the disclosure of which is incorporated herein by reference for all purposes.

BACKGROUND

1. Field of the Invention

One or more example embodiments relate to an optical network unit (ONU) for optical transmission in a burst mode, and more particularly, to an OW including a burst-mode ONU optical transceiver including a receiver configured to receive a continuous optical signal and a transmitter configured to stably transmit a burst-mode optical packet.

2. Description of Related Art

A passive optical network (PON) may transmit data signals to subscribers at an ultrahigh speed, and not require installation of a system using power between a telecommunication office and a subscriber. The PON may use an optical splitter in the middle of an optical line, and may transmit a signal using a method of transmitting a signal (e.g., downlink signal) from the telecommunication office to a subscriber through broadcasting, and transmitting a signal (e.g., uplink signal) from a subscriber to the telecommunication office through time-division multiplexing access (TDMA). Thus, an optical network unit (ONU) used on a subscriber side may need to have an uplink TDMA optical transmission function. An optical line terminal (OLT) used for the telecommunication office may allocate, to each of ONUs connected to the PON, a time at which an ONU transmits an uplink signal. This is to prevent uplink signals transmitted from the ONUS from overlapping in terms of time because an uplink signal of the PON is operated through the TDMA. Thus, an ONU optical transceiver used for an ONU may need to have a downlink optical signal receiving function and an uplink burst-mode optical transmission function. The burst-mode optical transmission function may enable an uplink optical signal to be output only at a time allowed for an ONU for data transmission to transmit an optical signal through time-division multiplexing (TDM). That is, the burst-mode optical transmission function may enable data to be output by turning off an optical signal at a time not allowed for an ONU and turning on an optical signal only at a time allowed for the ONU.

Figure 1:
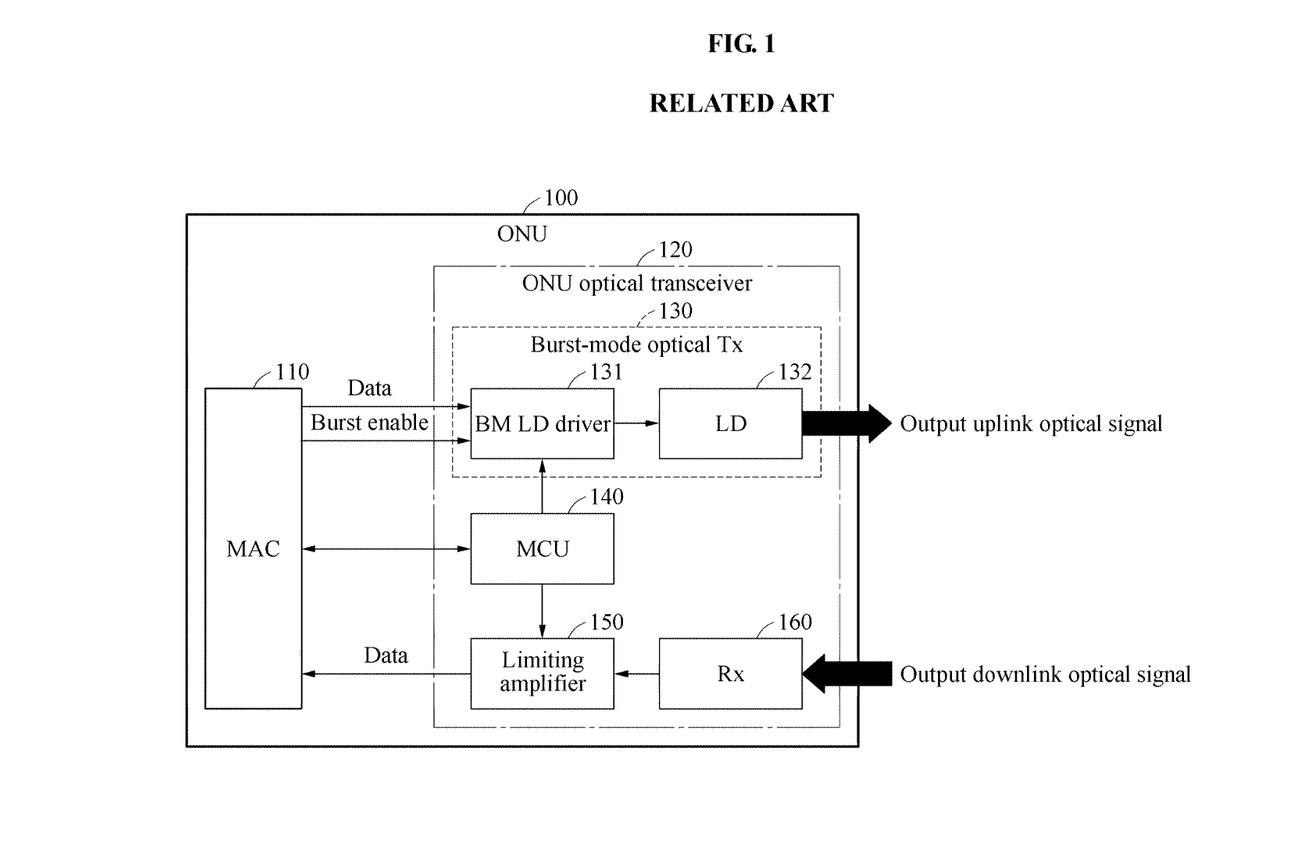
FIG. 1 is a diagram illustrating an example of a configuration of an existing optical network unit (ONU) and an existing ONU optical transceiver according to related art.

FIG. 1 is a diagram illustrating an example of a configuration of an existing ONU and an existing ONU optical transceiver according to related art. Referring to FIG. 1, a burst-mode optical transceiver used for an ONU optical transceiver 120 may transmit an uplink optical signal in a burst mode by operating a communication laser diode (LD) 132 in the burst mode, and receive a downlink optical signal using an optical receiver (Rx) 160. The ONU optical transceiver 120 includes a burst-mode optical transmitter (Tx) 130 configured to convert an electrical signal output from a media access control (MAC) 110 to an optical signal through electrical-to-optical conversion.

The ONU optical transceiver 120 also includes the Rx 160 configured to convert the received optical signal to an electrical signal through optical-to-electrical conversion, and a limiting amplifier 150 configured to amplify the electrical signal obtained through the optical-to-electrical conversion and transmit the amplified signal to the MAC 110. Such operations of the ONU optical transceiver 120 may be controlled by a microcontroller unit (MCU).

The burst-mode Tx 130 may transmit a burst-mode optical signal using, as the LD 132, a distributed feedback (DFB)-LD that is directly modulated. The MAC 110 of an ONU 100 may generate a burst-enable signal used to control an operation of turning on or off the DFB-LD along with an electrical data signal, and amplify an electrical signal and transmit the amplified electrical signal to the DFB-LD such that a burst-mode driver integrated circuit (IC), or a BM LD driver 131 as illustrated, for driving the DFB-LD receives each signal and then drives the DFB-LD. Such a method may be simple and thus be suitable to be applied to the ONU optical transceiver 120.

However, a recently developed PON may have an optical signal speed increasing to 10 gigabits per second (Gb/s), and standardization for systems supporting 25 Gb/s to the maximum is under development. Thus, for example, when directly modulating the conventionally-used DFB-LD and transmitting an optical signal at 10 Gb/s in a 1550 nanometers (nm) band, a transmission distance may be restricted to approximately 10 kilometers (km) by chromatic dispersion of an optical fiber included in an optical line, and thus such a method may not be readily applicable to the PON requiring a transmission distance of 20 km. In addition, when moving an operating wavelength to a 1300 nm band, a chromatic dispersion value of the optical fiber may be reduced and a 10 Gb/s transmission may be enabled. However, when a transmission speed increases to 25 Gb/s, a transmission distance may be restricted.

Thus, to tackle such an issue related to a transmission distance restricted by chromatic dispersion in an optical line, an external modulation-type light source may need to be used in lieu of a direct modulation-type light source. A representative example of the external modulation-type light source may be an electro-absorption modulated laser (EML) in which an electro-absorption modulator (EAM) and an LD are integrated into a single chip. Herein, to operate the EML in a burst mode, each of the EAM and the LD may need to be controlled to be in the burst mode. For this, a burst-mode EML driver IC may also be needed. However, there is not a commercial burst-mode EML driver IC, and thus the development of such a burst-mode EML driver IC may be needed.

SUMMARY

An aspect provides an optical network unit (ONU) for optical transmission in a burst mode.

Another aspect provides an ONU optical transceiver including an electric circuit configured to operate a burst-mode electro-absorption modulated laser (EML) to readily transfer an uplink/downlink optical signal between an ONU and an optical line terminal (OLT) at a high speed.

The ONU optical transceiver may improve a transmission distance that may be restricted by chromatic dispersion in an optical line by using a downlink optical receiver configured to receive a downlink signal and an uplink optical transmitter using the burst-mode EML, and facility a burst-mode operation of the EML by simplifying such a burst-mode circuit.

According to an example embodiment, there is provided an ONU including an EML transmitter including a laser diode (LD) and configured to transmit an uplink optical signal through the LD, an electro-absorption modulator (EAM) driver integrated circuit (IC) (EAM driver IC) configured to amplify an uplink data signal and provide the amplified uplink data signal to the EML transmitter, an LD burst-mode driving circuit configured to control an operation of turning on or off the LD based on a burst-enable signal, and a media access control (MAC) configured to transmit the data signal to the EAM driver IC and transmit the burst-enable signal to the LD burst-mode driving circuit.

The ONU may further include a receiver configured to receive a downlink optical signal and convert the received downlink optical signal to a downlink electrical signal, and a limiting amplifier configured to reamplify the downlink electrical signal received from the receiver and output a downlink data signal. Herein, the MAC may receive the downlink data signal output from the limiting amplifier through the reamplifying.

The ONU may further include a microcontroller unit (MCU) configured to control the EML transmitter and the EAM driver IC.

The uplink data signal may be in a non-return-to-zero (NRZ) form.

The burst-enable signal may be embodied as an electrical signal with a potential difference.

The LD burst-mode driving circuit may include an operational amplifier (OPAMP) configured to compare an input voltage value and a set voltage value and control the voltage values to be equal, a current monitoring IC configured to monitor a current value flowing to the EML transmitter and convert the current value to a voltage and then input the voltage to the OPAMP as the input voltage value, a first transistor configured to receive the set voltage value from the MCU and receive the burst-enable signal from the MAC and then input the set voltage value to the OPAMP, and a second transistor configured to receive a signal output from the OPAMP and allow a current to flow to the EML transmitter.

The LD burst-mode driving circuit may further include a first capacitor configured to perform low-pass filtering before the set voltage value output from the first transistor to be input to the OPAMP is input to the OPAMP.

The LD burst-mode driving circuit may further include a feedback loop configured to feed an output of the OPAMP back to an input end of the OPAMP receiving the input voltage value. The feedback loop may include a second capacitor to prevent a rapid change in voltage.

The LD burst-mode driving circuit may include an OPAMP configured to compare an input voltage value and a voltage value set from the MCU and control the voltage values to be equal, a current monitoring IC configured to monitor a current value flowing to the EML transmitter and convert the current value to a voltage and then input the voltage to the OPAMP as the input voltage value, a first transistor configured to receive a signal output from the OPAMP and receive the burst-enable signal from the MAC and then output an electrical signal, and a second transistor configured to receive the electrical signal output from the first transistor and allow a current to flow to the EML transmitter.

The LD burst-mode driving circuit may further include a first capacitor configured to perform low-pass filtering before the electrical signal output from the first transistor is input to the second transistor.

The LD burst-mode driving circuit may further include a feedback loop configured to feed an output of the OPAMP back to an input end of the OPAMP receiving the input voltage value. The feedback loop may include a second capacitor to prevent a rapid change in voltage.

According to another example embodiment, there is provided an LD burst-mode driving circuit of an ONU, the LD burst-mode driving circuit including an OPAMP configured to compare an input voltage value and a set voltage value and control the voltage values to be equal, a current monitoring IC configured to monitor a current value flowing to an EML transmitter and convert the current value to a voltage and then input the voltage to the OPAMP as the input voltage value, a first transistor configured to receive the set voltage value from an MCU and receive a burst-enable signal from a MAC and then input the set voltage value to the OPAMP, and a second transistor configured to receive a signal output from the OPAMP and allow a current to flow to the EML transmitter.

The LD burst-mode driving circuit may further include a first capacitor configured to perform low-pass filtering before the set voltage value output from the first transistor to be input to the OPAMP is input to the OPAMP.

The LD burst-mode driving circuit may further include a feedback loop configured to feed an output of the OPAMP back to an input end of the OPAMP receiving the input voltage value. The feedback loop may include a second capacitor to prevent a rapid change in voltage.

According to still another example embodiment, there is provided an LD burst-mode driving circuit of an ONU, the LD burst-mode driving circuit including an OPAMP configured to compare an input voltage value and a voltage value set from an MCU and control the voltage values to be equal, a current monitoring IC configured to monitor a current value flowing to an EML transmitter and convert the current value to a voltage and then input the voltage to the OPAMP as the input voltage value, a first transistor configured to receive a signal output from the OPAMP and receive a burst-enable signal from a MAC and then output an electrical signal, and a second transistor configured to receive the electrical signal output from the first transistor and allow a current to flow to the EML transmitter.

The LD burst-mode driving circuit may further include a first capacitor configured to perform low-pass filtering before the electrical signal output from the first transistor is input to the second transistor.

The LD burst-mode driving circuit may further include a feedback loop configured to feed an output of the OPAMP back to an input end of the OPAMP receiving the input voltage value. The feedback loop may include a second capacitor to prevent a rapid change in voltage.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

Figure 2:
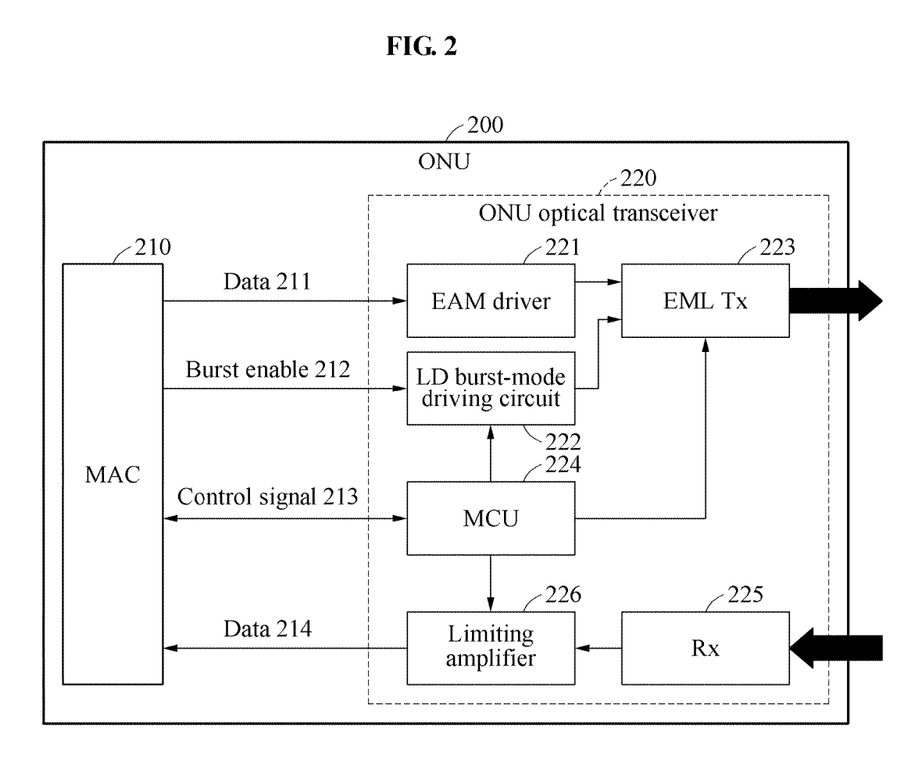
FIG. 2 is a diagram illustrating an example of a configuration of an ONU including a laser diode (LD) burst-mode driving circuit according to an example embodiment.

FIG. 2 is a diagram illustrating an example of a configuration of an optical network unit (ONU) including a laser diode (LD) burst-mode driving circuit according to an example embodiment.

Referring to FIG. 2, an ONU 200 includes a media access control (MAC) 210 and an ONU optical transceiver 220. The ONU optical transceiver 220 includes an electro-absorption modulator (EAM) driver integrated circuit (IC) (EAM driver) 221, an LD burst-mode driving circuit 222, and an electro-absorption modulated laser (EML) transmitter (Tx) (EML Tx) 223, a microcontroller unit (MCU) 224, a receiver (Rx) 225, and a limiting amplifier 226.

The EAM driver 221 may amplify an uplink data signal 211 received from the MAC 210 and provide the amplified signal to the EML Tx 223 to operate an EAM of the EML Tx 223.

The EML Tx 223 may include an LD, and transmit an uplink optical signal through the LD.

The LD burst-mode driving circuit 222 may control an operation of turning on or off the LD based on a burst-enable signal 212 received from the MAC 210.

The Rx 225 may receive a downlink optical signal and convert it to a downlink electrical signal. The Rx 225 may include a photodiode and a transimpedance amplifier (TIA).

The limiting amplifier 226 may reamplify the downlink electrical signal received from the Rx 225 and output it as a downlink data signal 214 to the MAC 210.

The MCU 224 may transmit and receive a control signal 213 to and from the MAC 210, and control the ONU optical transceiver 220. The MCU 224 may control the EML Tx 223 and the LD burst-mode driving circuit 222.

The MAC 210 may transmit the data signal 211 desired to be transmitted to the EAM driver 221 and transmit the burst-enable signal 212 to the LD burst-mode driving circuit 222, and receive the downlink data signal 214 from the limiting amplifier 226. Herein, the uplink data signal 211 and the downlink data signal 214 may be in a non-return-to-zero (NRZ) form, and the burst-enable signal 212 may be embodied as an electrical signal with a potential difference.

The MAC 210 may transmit the uplink data signal 211 at a burst-enable time and transmit an idle pattern, in lieu of data, at a burst-disable time, and thus the EAM driver 221 may receive a continuous signal and not need to operate in the burst mode.

The LD in the EML Tx 223 may be turned on at the burst-enable time to output light, and turned off at the burst-disable time not to output light. That is, to operate in the burst mode, the LD burst-mode driving circuit 222 may be applied to control a burst-mode operation of the LD.

Figure 3:
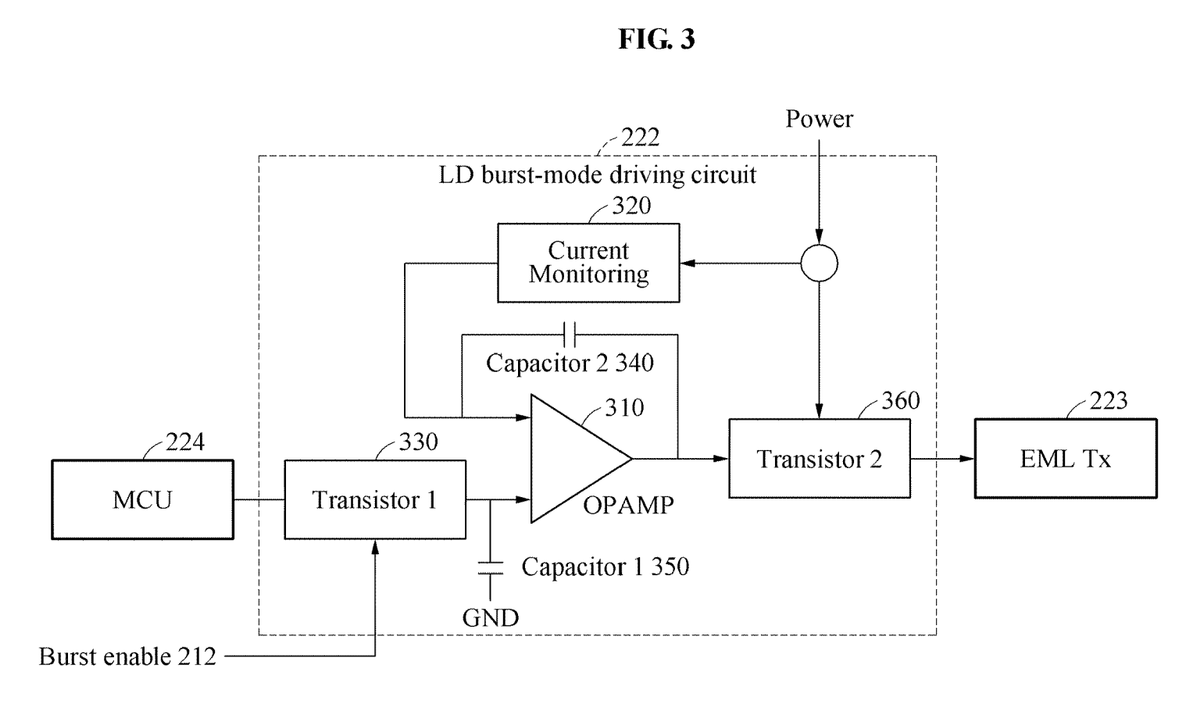
FIG. 3 is a diagram illustrating an example of an LD burst-mode driving circuit according to an example embodiment.

FIG. 3 is a diagram illustrating an example of an LD burst-mode driving circuit according to an example embodiment.

Referring to FIG. 3, the LD burst-mode driving circuit 222 includes an operational amplifier (OPAMP) 310, a current monitoring IC 320, a first transistor (transistor 1) 330, a second transistor (transistor 2) 360, a first capacitor (capacitor 1) 350, and a second capacitor (capacitor 2) 340.

The OPAMP 310 may compare an input voltage value and a set voltage value, and control the voltage values to be equal.

The current monitoring IC 320 may monitor a current value flowing to the EML Tx 223 and convert the current value to a voltage, and then input the voltage to the OPAMP 310 as the input voltage value.

Transistor 1 330 may receive the set voltage value from the MCU 224 and receive the burst-enable signal 212 from the MAC 210, and then input the set voltage value to the OPAMP 310.

Transistor 2 360 may receive a signal output from the OPAMP 310 and allow a current to flow to the EML Tx 223.

Capacitor 1 350 may perform low-pass filtering before the set voltage value output from transistor 1 330 is input to the OPAMP 310.

Capacitor 2 340 may be included in a feedback loop configured to feed an output of the OPAMP 310 back to an input end of the OPAMP 310 receiving the input voltage value, and may thus prevent a rapid change in voltage.

As described above, the LD burst-mode driving circuit 222 may have two functions: a function of stably supplying a current such that a current flowing to the EML Tx 223 is equal to a set value input from the MCU 224; and a current supplying or blocking function based on whether a burst mode is enabled or not.

When supplying a driving current to the EML Tx 223 to operate it and controlling a supply current of the LD to be supplied to the LD with a waveform of a square pulse, such as, for example, the burst-enable signal 212, a distortion of an output optical signal may occur due to a transient response characteristic of the LD. That is, in a case in which the current to be supplied to the LD changes rapidly in a short period of time, an output optical intensity of the LD may change due to relaxation oscillation of the LD and a voltage may also change in the OPAMP 310 controlling a voltage to be supplied to the LD.

To prevent such an issue described above, two structures may be used. Firstly, the LD burst-mode driving circuit 222 may use the current monitoring IC 320 to monitor a current value flowing to the EML Tx 223 and convert it to a voltage, and then input the voltage to the OPAMP 310. The OPAMP 310 may receive the set voltage value from the MCU 224. The OPAMP 310 may form a feedback loop to have a voltage comparer, and include capacitor 2 340 in the feedback loop to prevent a rapid change in voltage.

Secondly, the LD burst-mode driving circuit 222 may receive the burst-enable signal 212 from the MAC 210, and control a driving voltage of the LD by referring to the received burst-enable signal 212. Referring to FIG. 3, the LD burst-mode driving circuit 222 may receive, from the MCU 224, the set voltage value corresponding to a value controlling a current of the LD, and input the burst-enable signal 212 received from the MAC 210 to transistor 1 330. An electrical signal output from transistor 1 330 may be subject to low-pass filtering while passing through capacitor 1 350, and then a signal obtained through the low-pass filtering of which a raising time and a falling time gradually change may be input to the OPAMP 310.

The OPAMP 310 may compare the set voltage value and a voltage value to be input to the LD after the LD is turned on, and control the voltage values to be equal. An electrical signal output from the OPAMP 310 may operate transistor 2 360 to allow a current to flow to the EML Tx 223.

Figure 5:
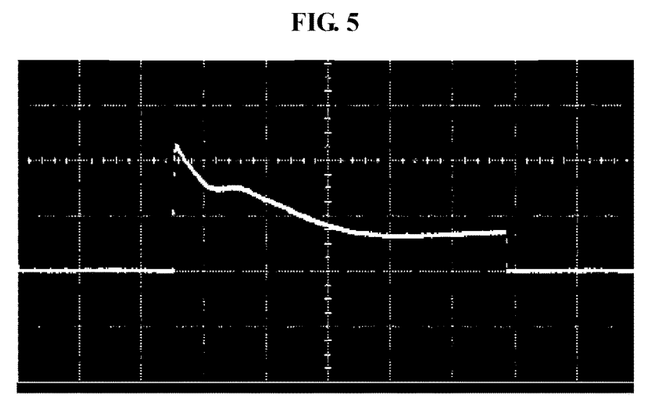
FIG. 5 is a diagram illustrating a result of measuring an output signal of an LD when an LD burst-mode driving circuit does not use transistor 1 and capacitor 1 according to an example embodiment.

FIG. 5 is a diagram illustrating a result of measuring an output signal of an LD when an LD burst-mode driving circuit does not use transistor 1 and capacitor 1 according to an example embodiment.

Referring to FIG. 5, when the LD burst-mode driving circuit 222 does not use transistor 1 330 and capacitor 1 350, a signal intensity may rapidly increase and then decrease due to a transient response characteristic of the LD at the beginning of an optical signal as illustrated.

Figure 6:
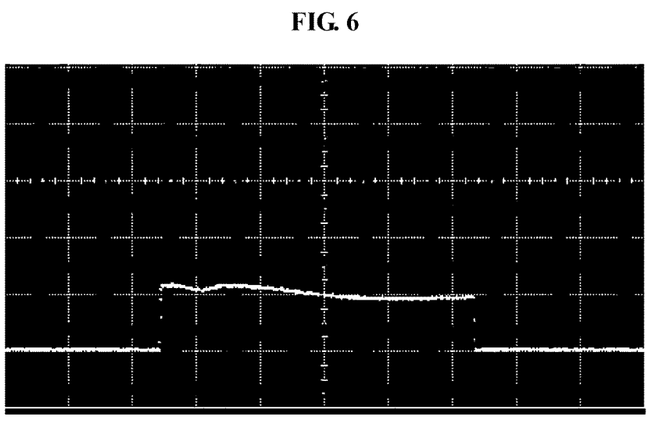
FIG. 6 is a diagram illustrating a result of measuring an output signal of an LD of an ONU according to an example embodiment.

FIG. 6 is a diagram illustrating a result of measuring an output signal of an LD of an ONU according to an example embodiment.

Referring to FIG. 6, dissimilar to the result described above with reference to FIG. 5, an intensity of an optical signal may be maintained consistently when the LD burst-mode driving circuit 222 uses transistor 1 330 and capacitor 1 350.

Figure 7:
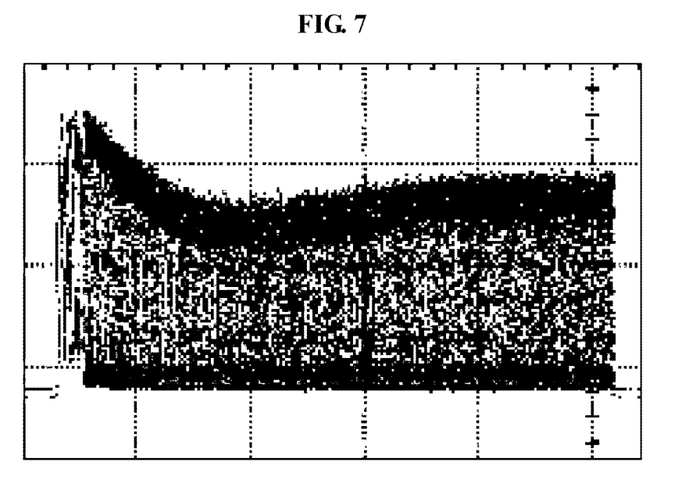
FIG. 7 is a diagram illustrating a result of measuring an optical packet signal of an electro-absorption modulated laser (EML) transmitter when an LD burst-mode driving circuit does not use transistor 1 and capacitor 1 according to an example embodiment.

FIG. 7 is a diagram illustrating a result of measuring an optical packet signal of an EML Tx when an LD burst-mode driving circuit does not use transistor 1 and capacitor 1 according to an example embodiment.

Referring to FIG. 7, when the LD burst-mode driving circuit 222 does not use transistor 1 330 and capacitor 1 350, a signal intensity may rapidly increase and then decrease due to a transient response characteristic of the LD at the beginning of an NRZ modulated optical signal as illustrated.

Figure 8:
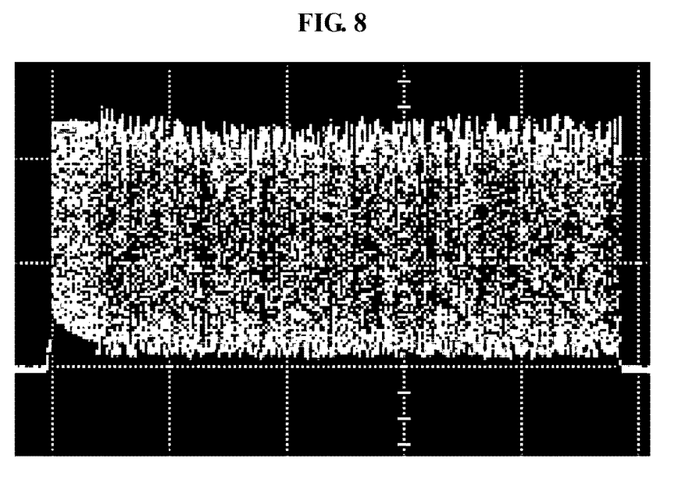
FIG. 8 is a diagram illustrating a result of measuring an optical packet signal of an EML transmitter of an ONU according to an example embodiment.

FIG. 8 is a diagram illustrating a result of measuring an optical packet signal of an EML Tx of an ONU according to an example embodiment.

Referring to FIG. 8, dissimilar to the result described above with reference to FIG. 7, an intensity of an optical signal may be maintained consistently when the LD burst-mode driving circuit 222 uses transistor 1 330 and capacitor 1 350.

Figure 4:
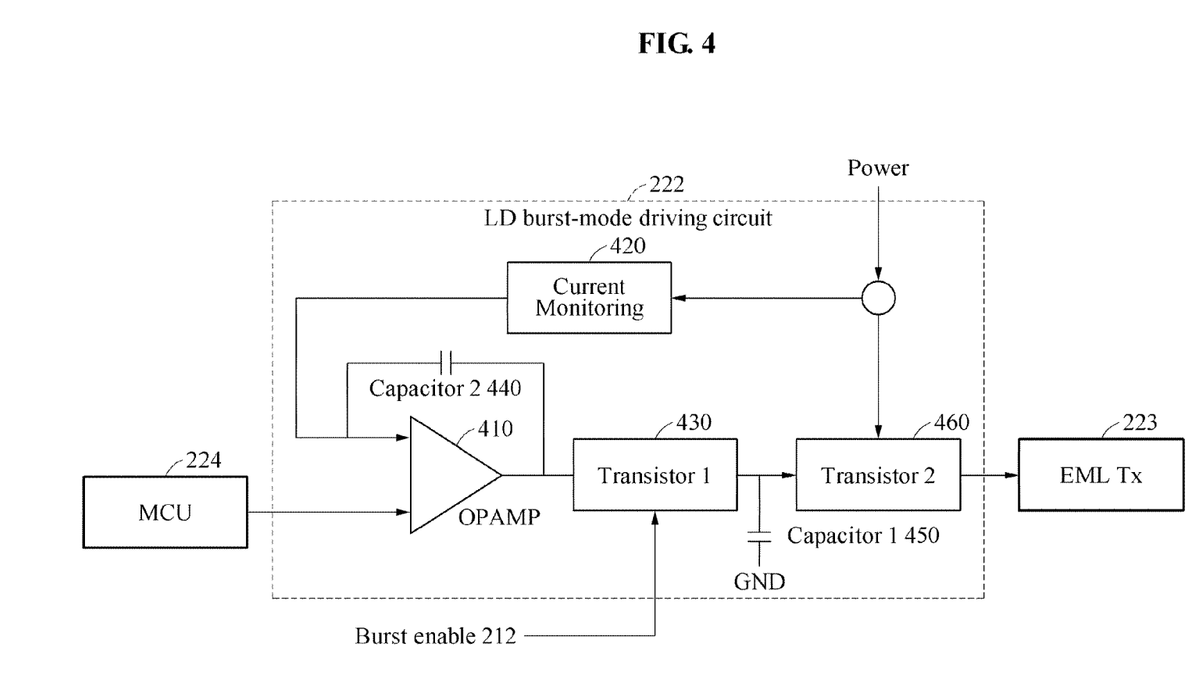
FIG. 4 is a diagram illustrating another example of an LD burst-mode driving circuit according to an example embodiment.

FIG. 4 is a diagram illustrating another example of an LD burst-mode driving circuit according to an example embodiment.

Referring to FIG. 4, the LD burst-mode driving circuit 222 includes an OPAMP 410, a current monitoring IC 420, a first transistor (transistor 1) 430, a second transistor (transistor 2) 460, a first capacitor (capacitor 1) 450, and a second capacitor (capacitor 2) 440.

The OPAMP 410 may compare an input voltage value and a voltage value set from the MCU 224, and control the voltage values to be equal.

The current monitoring IC 420 may monitor a current value flowing to the EML Tx 223 and convert it to a voltage, and then input the voltage to the OPAMP 410 as the input voltage value.

Transistor 1 430 may receive a signal output from the OPAMP 410 and receive the burst-enable signal 212 from the MAC 210, and then output an electrical signal.

Transistor 2 460 may receive the electrical signal output from transistor 1 430 and allow a current to flow to the EML Tx 223.

Capacitor 1 450 may perform low-pass filtering before the set voltage value output from transistor 1 430 is input to the OPAMP 410.

Capacitor 2 440 may be included in a feedback loop configured to feed an output of the OPAMP 410 back to an input end thereof receiving the input voltage value to prevent a rapid change in voltage.

That is, the LD burst-mode driving circuit 222 may use the current monitoring IC 420 to monitor a current value flowing to the EML Tx 223 and convert the current value to a voltage, and then input the voltage to the OPAMP 410. The OPAMP 410 may receive the set voltage value from the MCU 224. The OPAMP 410 may form the feedback loop to have a voltage comparer, and include capacitor 2 440 in the feedback loop to prevent a rapid change in voltage.

The LD burst-mode driving circuit 222 may receive the burst-enable signal 212 from the MAC 210, and control a driving voltage of the LD by referring to the received burst-enable signal 212. Referring to FIG. 4, the LD burst-mode driving circuit 222 may receive, from the MCU 224, the set voltage value corresponding to a value controlling a current of the LD, and input the set voltage value to the OPAMP 410. The burst-enable signal 212 received from the MAC 210 may be connected to transistor 1 430. When an electrical signal output from the OPAMP 410 is connected to transistor 1 430 and the burst-enable signal 212 is input to transistor 1 430, transistor 1 430 may output an electrical signal. The electrical signal output from transistor 1 430 may become subject to low-pass filtering while passing through capacitor 1 450. A signal obtained through the low-pass filtering of which a raising time and a falling time gradually change may allow transistor 2 460 to operate and allow a voltage to be supplied to the EML Tx 223.

According to example embodiments described herein, it is possible to reduce a transient response characteristic of an LD that may occur during an operation of turning on or off the LD, and consistently maintain an intensity of a burst-mode optical signal output from an optical transmitter by using an EML for an ONU optical transceiver and also using an LD burst-mode driving circuit separate from an EAM driver IC to operate the EML in a burst mode. In addition, it is possible to embody a burst-mode operation of the EML only using a feedback loop-type OPAMP, a peripheral circuit thereof, and a high-speed transistor and capacitor.

The components described in the example embodiments of the present disclosure may be achieved by hardware components including at least one of a digital signal processor (DSP), a processor, a controller, an application specific integrated circuit (ASIC), a programmable logic element such as a field programmable gate array (FPGA), other electronic devices, and combinations thereof. At least some of the functions or the processes described in the example embodiments of the present disclosure may be achieved by software, and the software may be recorded on a recording medium. The components, the functions, and the processes described in the example embodiments of the present disclosure may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An optical network unit (ONU) comprising:
an electro-absorption modulated laser (EML) transmitter comprising a laser diode (LD) and configured to transmit an uplink optical signal through the LD;
an electro-absorption modulator (EAM) driver integrated circuit (IC) (EAM driver IC) configured to amplify an uplink data signal and provide the amplified data signal to the EML transmitter;
an LD burst-mode driving circuit configured to control an operation of turning on or off the LD based on a burst-enable signal; and
a media access control (MAC) configured to transmit the data signal to the EAM driver IC and transmit the burst-enable signal to the LD burst-mode driving circuit,
wherein the LD burst-mode driving circuit comprises:
an operational amplifier (OPAMP) configured to compare an input voltage value and a set voltage value and control the voltage values to be equal;
a current monitoring IC configured to monitor a current value flowing to the EML transmitter and convert the current value to a voltage, and then input the voltage to the OPAMP as the input voltage value;
a first transistor configured to receive the set voltage value from an MCU and receive the burst-enable signal from the MAC, and then input the set voltage value to the OPAMP; and
a second transistor configured to receive a signal output from the OPAMP and allow a current to flow to the EML transmitter.

2. The ONU of claim 1, further comprising:
a receiver configured to receive a downlink optical signal and convert the received downlink optical signal to a downlink electrical signal; and
a limiting amplifier configured to reamplify the downlink electrical signal received from the receiver and output a downlink data signal,
wherein the MAC is configured to receive the downlink data signal output from the limiting amplifier through the reamplifying.

3. The ONU of claim 1, further comprising:
a microcontroller unit (MCU) configured to control the EML transmitter and the EAM driver IC.

4. The ONU of claim 1, wherein the uplink data signal is in a non-return-to-zero (NRZ) form.

5. The ONU of claim 1, wherein the burst-enable signal is embodied as an electrical signal with a potential difference.

6. The ONU of claim 1, wherein the LD burst-mode driving circuit further comprises:
a first capacitor configured to perform low-pass filtering before the set voltage value output from the first transistor to be input to the OPAMP is input to the OPAMP.

7. The ONU of claim 1, wherein the LD burst-mode driving circuit further comprises:
a feedback loop configured to feed an output of the OPAMP back to an input end of the OPAMP receiving the input voltage value,
wherein the feedback loop comprises:
a second capacitor to prevent a rapid change in voltage.

8. An optical network unit (ONU) comprising:
an electro-absorption modulated laser (EML) transmitter comprising a laser diode (LD) and configured to transmit an uplink optical signal through the LD,
an electro-absorption modulator (EAM) driver integrated circuit (IC) (EAM driver IC) configured to amplify an uplink data signal and provide the amplified data signal to the EML transmitter;
an LD burst-mode driving circuit configured to control an operation of turning on or off the LD based on a burst-enable signal; and
a media access control (MAC) configured to transmit the data signal to the EAM driver IC and transmit the burst-enable signal to the LD burst-mode driving circuit,
wherein the LD burst-mode driving circuit comprises:
an OPAMP configured to compare an input voltage value and a voltage value set from an MCU and control the voltage values to be equal;
a current monitoring IC configured to monitor a current value flowing to the EML transmitter and convert the current value to a voltage, and then input the voltage to the OPAMP as the input voltage value;
a first transistor configured to receive a signal output from the OPAMP and receive the burst-enable signal from the MAC, and then output an electrical signal; and
a second transistor configured to receive the electrical signal output from the first transistor and allow a current to flow to the EML transmitter.

9. The ONU of claim 8, wherein the LD burst-mode driving circuit further comprises:
a first capacitor configured to perform low-pass filtering before the electrical signal output from the first transistor is input to the second transistor.

10. The ONU of claim 8, wherein the LD burst-mode driving circuit further comprises:
a feedback loop configured to feed an output of the OPAMP back to an input end of the OPAMP receiving the input voltage value,
wherein the feedback loop comprises:
a second capacitor to prevent a rapid change in voltage.

11. The ONU of claim 8, further comprising:
a receiver configured to receive a downlink optical signal and convert the received downlink optical signal to a downlink electrical signal; and
a limiting amplifier configured to reamplify the downlink electrical signal received from the receiver and output a downlink data signal,
wherein the MAC is configured to receive the downlink data signal output from the limiting amplifier through the reamplifying.

12. The ONU of claim 8, further comprising:
a microcontroller unit (MCU) configured to control the EML transmitter and the EAM driver IC.

13. The ONU of claim 8, wherein the uplink data signal is in a non-return-to-zero (NRZ) form.

14. The ONU of claim 8, wherein the burst-enable signal is embodied as an electrical signal with a potential difference.

15. A laser diode (LD) burst-mode driving circuit of an optical network unit (ONU), comprising:
an operational amplifier (OPAMP) configured to compare an input voltage value and a set voltage value and control the voltage values to be equal;

a current monitoring integrated circuit (IC) configured to monitor a current value flowing to an electro-absorption modulated laser (EML) transmitter and convert the current value to a voltage, and then input the voltage to the OPAMP as the input voltage value;

a first transistor configured to receive the set voltage value from a microcontroller unit (MCU) and receive a burst-enable signal from a media access control (MAC), and then input the set voltage value to the OPAMP; and a second transistor configured to receive a signal output from the OPAMP and allow a current to flow to the EML transmitter.

16. The LD burst-mode driving circuit of claim 15, further comprising:

a first capacitor configured to perform low-pass filtering before the set voltage value output from the first transistor to be input to the OPAMP is input to the OPAMP.

17. The LD burst-mode driving circuit of claim 15, further comprising:

a feedback loop configured to feed an output of the OPAMP back to an input end of the OPAMP receiving the input voltage value, wherein the feedback loop comprises:

a second capacitor to prevent a rapid change in voltage.

18. A laser diode (LD) burst-mode driving circuit of an optical network unit (ONU), comprising:

an operational amplifier (OPAMP) configured to compare an input voltage value and a voltage value set from a microcontroller unit (MCU) and control the voltage values to be equal;

a current monitoring integrated circuit (IC) configured to monitor a current value flowing to an electro-absorption modulated laser (EML) transmitter and convert the current value to a voltage, and then input the voltage to the OPAMP as the input voltage value;

a first transistor configured to receive a signal output from the OPAMP and receive a burst-enable signal from a media access control (MAC), and then output an electrical signal; and a second transistor configured to receive the electrical signal output from the first transistor and allow a current to flow to the EML transmitter.

19. The LD burst-mode driving circuit of claim 18, further comprising:

a first capacitor configured to perform low-pass filtering before the electrical signal output from the first transistor is input to the second transistor.

20. The LD burst-mode driving circuit of claim 18, further comprising:

a feedback loop configured to feed an output of the OPAMP back to an input end of the OPAMP receiving the input voltage value, wherein the feedback loop comprises:

a second capacitor to prevent a rapid change in voltage.

* * * * *